United States Patent [19]

Daniel

[11] 4,228,596
[45] Oct. 21, 1980

[54] ILLUMINATED TEACHING DEVICE AND BOARD GAME

[75] Inventor: Linda A. Daniel, Phoenix, Ariz.

[73] Assignee: Jerry W. Daniel, Phoenix, Ariz. ; a part interest

[21] Appl. No.: 891,616

[22] Filed: Mar. 30, 1978

[51] Int. Cl.³ .......................... G09B 5/02; G09B 7/00; A63F 3/00

[52] U.S. Cl. ...................................... 35/9 B; 40/575; 273/237; 273/271

[58] Field of Search ............... 273/237, 1 E, 284, 1 T; 200/314; 35/9 B, 8 R; 235/146; 40/575

[56] References Cited

U.S. PATENT DOCUMENTS

| | | | |
|---|---|---|---|
| 2,092,577 | 9/1937 | Hornung | 35/9 B |
| 2,877,019 | 3/1959 | Keister | 273/237 |
| 3,639,745 | 2/1972 | Shiki | 200/314 X |
| 3,777,410 | 12/1973 | Robinson | 35/9 B |
| 3,795,989 | 3/1974 | Greenberg et al. | 35/9 B |
| 3,923,306 | 12/1975 | Cahn-Hidalgo et al. | 35/8 R X |
| 3,949,504 | 4/1976 | Willis et al. | 40/575 X |
| 4,072,310 | 2/1978 | Beam | 273/1 E |

Primary Examiner—Richard C. Pinkham
Assistant Examiner—Scott L. Brown
Attorney, Agent, or Firm—Cahill, Sutton & Thomas

[57] ABSTRACT

An illuminated teaching device and board game comprising a square receptacle having opaque side walls and bottom and a top wall formed with a plurality of orifices each of which receives a pushbutton switch for completing an electrical circuit from a battery to a lamp positioned beneath each section of the receptacle defined by vertical partitions arranged in normal relation to each other. Opposed side walls are formed with confronting channels which slidably receive the edges of a panel which performs different functions in providing aids to education. For teaching purposes, this removable panel includes sections of different colors and indicia, such as the names of colors, arithmetical figures or representations of such objects as pets. When used as a game board, each pushbutton switch may be depressed to turn on a light which is kept illuminated until the particular game or step thereof being played is completed.

7 Claims, 15 Drawing Figures

US Patent  Oct. 21, 1980  Sheet 1 of 2  4,228,596
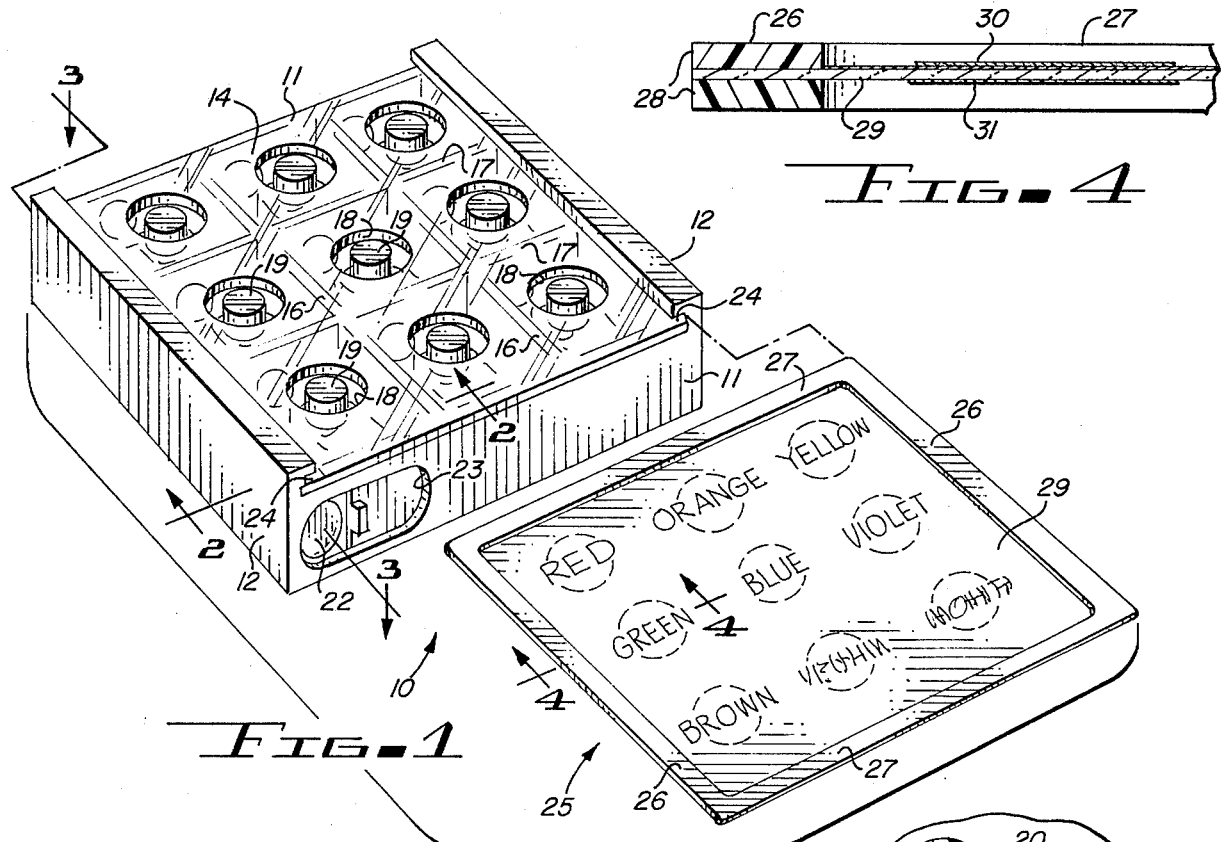
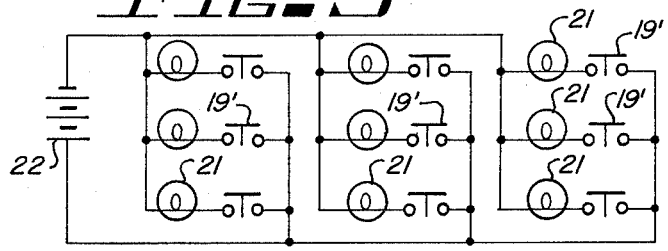
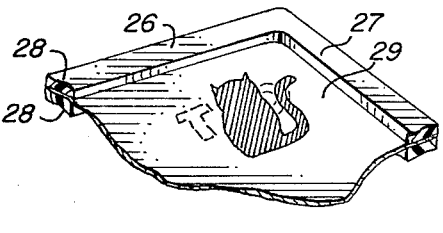

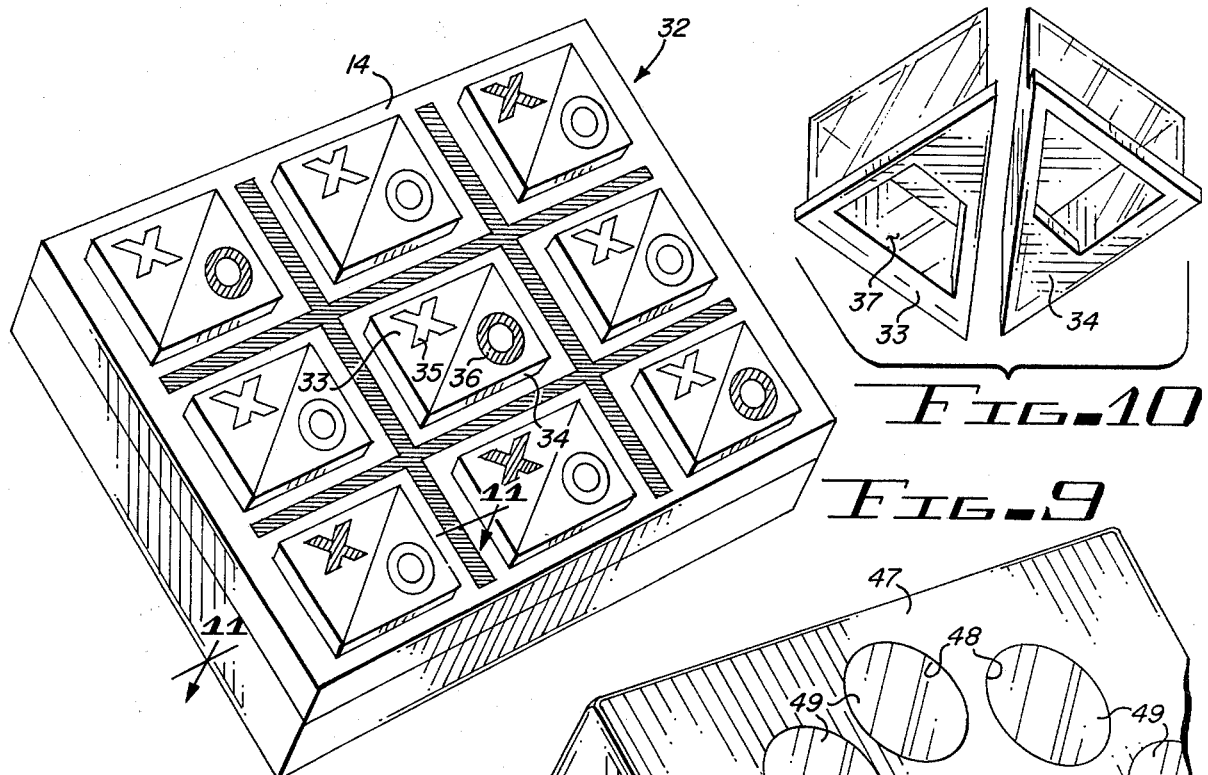
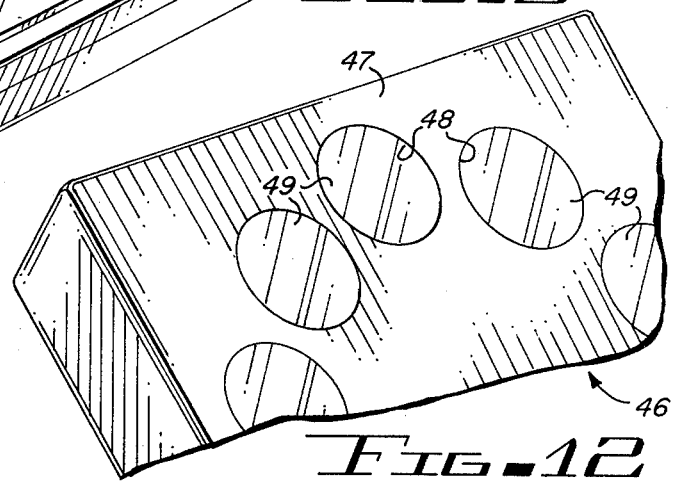
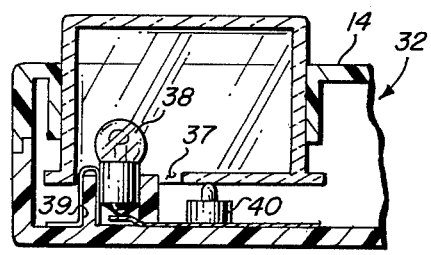
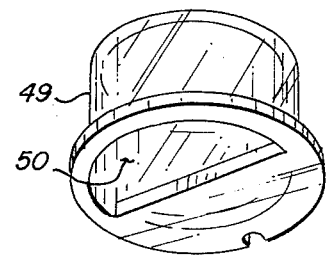
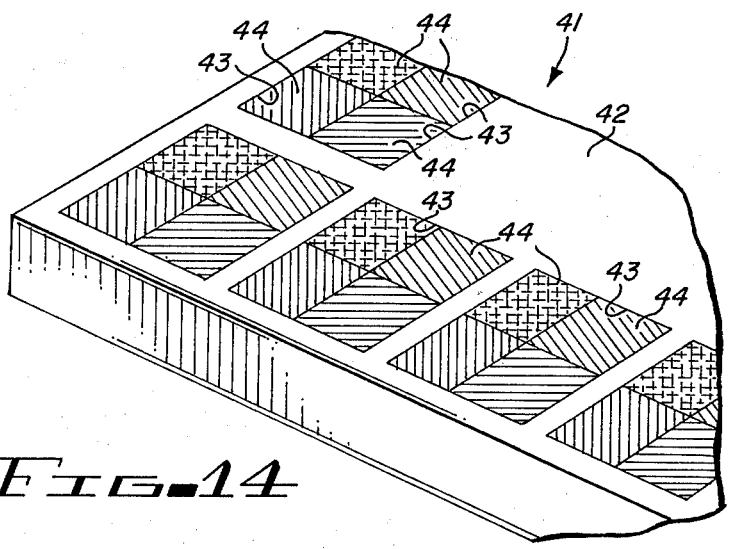
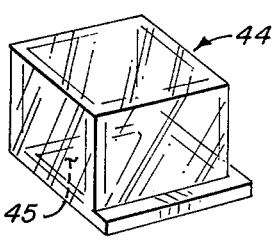

ILLUMINATED TEACHING DEVICE AND BOARD GAME

The present invention relates to a teaching aid and a game board and is concerned primarily with a device of this character which includes a receptacle that is divided into a plurality of sections by vertical partitions, with each section having a pushbutton switch that controls a light in each section. In one embodiment, a panel is removably positioned over the top wall of the receptacle and pressure may be exerted thereagainst to operate any of the pushbutton switches desired.

BACKGROUND OF THE INVENTION

Tic-tac-toe is a game which is widely played and consists essentially of nine squares, sections or divisions which are arranged in three rows, with three such sections in each row. In playing the game, two contestants are involved and the object of the game is to place markings of a type identifying a particular player in a row of three, and which rows may be either vertical, horizontal or diagonal. Inasmuch as a player having the first move in such a game has a decided advantage, a corollary object is to prevent such player from obtaining three markings in a row, with the ultimate hope of achieving a tie game. At the present time, there are known examples of board games for playing tic-tac-toe in which lights are illuminated for each section, as will be later discussed. Moreover, in the playing of board games, such as Monopoly, Parcheesi, or other game in which a playing piece is moved a number of steps determined either by skill or chance, and particularly in Monopoly it is often desirable to indicate that a particular piece of property is being held by a player, but there are no known Monopoly boards in which the ownership of a piece of property is indicated by a light being illuminated in a section for that piece of property. In other board games, the movement of a playing piece over a series of steps is involved but at the present time there are no games of this type in which the movement of a playing piece is determined by the illumination of a light.

In assisting young children in learning the letters of the alphabet, figures, colors and representations of certain objects, such as pets, it is believed to be desirable to provide a teaching aid in which a receptacle has a plurality of sections each of which has an electric light positioned therein, together with a pushbutton switch which is operated from the top of the receptacle by pressing against a flexible removable panel. It is believed that there is no known device of this character which is susceptible of such multiplicity of teaching aids.

Before this application was prepared for filing in the U.S. Patent and Trademark Office, a patentability search was conducted. This search brings to light the following patents as those found which are believed to come closest to the present subject matter:

| 3,947,975 | Wallach | 3,367,663 | Marks |
| 3,224,778 | Schram | 3,425,699 | D'Onofrio |
| 3,779,553 | Secter | 3,778,063 | Strand |
| 3,145,993 | Archer | 2,877,019 | Keister |

A brief comment is made on the more relevant of these patents, as follows:

Keister

This patent is directed to a game for playing tic-tac-toe in which the playing board, which in this instance is vertical, is provided with nine sections each of which contains a light which is illuminated by a particular circuitry. If desired, the player may play against a machine as his opponent and in such event the machine always either wins or draws.

Archer

This patent is also directed to a so-called "solitaire" tic-tac-toe game. The player may either play against another player as an opponent or against a machine. Here again, the machine always wins or draws.

Marks

This is another example of an electric tic-tac-toe game in which two banks or rows of switches for the electric lights are employed, with nine switches being contained in each bank, thus enabling a player to illuminate any section of the playing board surface provided it has not already been illuminated by an opposing player.

D'Onofrio

This patent is to an electrical game of chance, with a tic-tac-toe layout being illustrated in FIG. 1. Note that the various electrical bulbs are exposed.

Strand

This patent is to an apparatus for playing tic-tac-toe in which the top panel of the receptacle is divided into nine squares and is translucent. Beneath this top panel are nine sections any one of which is designed to slidably receive a colored square or one bearing a particular design. An electric light in the receptacle is effective on a particular removable panel and the top panel to afford a desired color effect.

No comment is made on the remaining patents other than to point out it is believed they complete the picture of the pertinent prior art.

OBJECTS OF THE INVENTION

With the foregoing conditions in mind, the present invention has in view the following objectives:

1. To provide a teaching aid and game board which consists essentially of a rectangularly-shaped receptacle defined by opaque side and bottom walls, a fixed top panel, and in which the receptacle is divided into sections or compartments by vertical partitions which are normal to each other and the side walls;

2. To provide, in a teaching aid and game board of the type noted, a fixed top panel divided into a plurality of sections corresponding to the compartments therebeneath and having an orifice for each such section, together with one or more pushbutton switches in each such orifice;

3. To provide, in a teaching aid and game board of the character aforesaid, a power source such as a battery in the receptacle below the fixed top panel, together with an electric light which is either placed in circuit with said battery by operation of the pushbutton switch or cut out of such circuit by a subsequent operation of the pushbutton switch;

4. To provide, in a teaching aid and game board of the kind described, a removable top panel which assumes a position over the fixed top panel and a particular portion of which may be flexed by applying pressure thereto over a pushbutton switch to turn such switch on or off;

5. To provide, in a teaching aid of the type noted, a plurality of square-shaped openings in the fixed top panel with each such opening receiving four pushbuttons having different identifying data thereon and a light which is received in a downwardly opening recess in each pushbutton, a power source and a microswitch which is operated by the pushbutton to selectively turn on or off one of the lights in a pushbutton;

6. To provide, in a game board of the character aforesaid, a plurality of square-shaped openings in the fixed top panel with each such opening receiving four pushbuttons having different identifying data thereon and a light which is received in a downwardly opening recess in each pushbutton, a power source and a microswitch which is operated by the pushbutton to selectively turn on or off one of the lights in a pushbutton; and 7. To provide a game board of the kind described which is particularly adapted for the playing of tic-tac-toe. This game board has a fixed top panel having nine square openings arranged therein in accordance with the typical arrangement of a tic-tac-toe board, with a pair of triangularly shaped pushbuttons which are complemental to each other to define a complete square with the pushbuttons in each square opening having contrasting indicia on its upper face to identify two contestants, a downwardly opening recess below each identification indicia in each square, a source of electric power which is common to all of said squares, and a microswitch operatively associated with each triangularly shaped pushbutton, whereby depression of a particular triangularly shaped pushbutton turns on or off the lamp associated with that pushbutton.

Various other more detailed objects and advantages of the invention such as arise in connection with carrying out the above-noted ideas in a practical embodiment will in part become apparent and in part be hereinafter stated as the description of the invention proceeds.

SUMMARY OF THE INVENTION

The foregoing objects are achieved by providing a teaching aid and game board which has many features in common with both of these functions and which consists essentially of a rectangularly shaped receptacle including peripheral walls comprising a pair of opposed side walls, a pair of opposed end walls, a bottom, and a fixed top panel, all of which are opaque. When the device is used as a teaching aid, the receptacle is divided into a plurality of rectangularly shaped compartments by vertical partitions which are normal to each other and to the side end walls. The fixed top panel is formed with an orifice above each compartment and a pushbutton switch is received in this orifice.

An electric lamp is included in each compartment and the circuit thereto from a power source, such as a battery, is controlled by the pushbutton switch. This switch is adapted to turn each particular lamp on or off in sequence.

The side walls of the receptacle extend above the level of the fixed top panel and are formed with confronting grooves which slidably receive the side edges of a panel which is translucent and flexible to a required degree. Thus, this panel may be positioned over the fixed top panel and by applying pressure thereto over the orifice, the pushbutton received in that orifice may be operated to turn the switch on or off. This flexible panel may include various indicia such as letters, numerals, and pictorial representations to assist in the teaching of children of tender years. Thus, purely by way of example, in that portion of the removable panel which is received over a particular compartment, it may display a particular color such as red with the word "red" inscribed thereon. This is true of all the other colors with which the child is taught to be familiar. Arithmetical figures may also be included over each compartment, with one such number representing the result of an arithmetical problem such as addition or subtraction. Then again, an image of an object, such as a cat, may be inscribed on this upper flexible panel and the word "cat" printed thereover to enable the child to become familiar with the outline of a cat.

In an embodiment for playing games, of which Monopoly and Parcheesi are good examples because such games are designed to accommodate up to four players, the top fixed panel is formed with four square-shaped openings in each of which is positioned a pushbutton of a translucent material such as plastic. The four pushbuttons in each square opening substantially fill that opening. Each of these pushbuttons is formed with a downwardly opening recess in which an electric lamp is positioned.

A power source, such as one or more batteries or a transformer, is included in the receptacle below the fixed top panel and is connected by microswitches with each lamp so that depression of a particular pushbutton energizes or deenergizes a particular lamp. As the game is intended to accommodate four players, the four pushbuttons may be of four different colors or have other identifying indicia inscribed thereon such as the letters "A", "B", "C", etc., or "1", "2", "3", etc.

In playing a game including the four pushbuttons in each square-shaped opening, a player will determine the number of steps or spaces he is to cover in a particular move either by skill or use of a chance device such as dice or a spinning wheel. After the number of spaces has been counted out, the player turns on the lamp bearing the particular color or other indicia which identifies that player. This action is repeated for each move of each of the players until the game is completed.

In the playing of a game such as Monopoly, the ownership of a particular piece of property by a particular player may be indicated by turning on the light which bears the identifying indicia for that player at the particular piece of property.

If the game board is to be used for playing tic-tac-toe, the fixed upper panel is formed with nine square-shaped openings of three rows of three. Operatively positioned in each of these openings is a pair of triangularly shaped pushbuttons which complement each other to fill each square opening. One pushbutton in each square will carry a symbol, such as a cross, which is used almost universally in playing tic-tac-toe, and the other triangularly shaped pushbutton will be formed with a contrasting symbol such as a circle. These pushbuttons are translucent, preferably being of plastic, and each has a downwardly opening recess which receives an electric lamp. A power source, such as a battery, is adapted to be connected to any or all of the said lamps by a microswitch which is operatively associated with each pushbutton. Thus, when a player wishes to indicate that he is occupying a particular square, he exerts pressure on his pushbutton signal for that square and his signal is illuminated. The other player then performs a similar operation on one of the pushbuttons of one of the other squares to indicate its occupancy by the second player. Such moves are continued until one player has three of his symbols in alignment, which may be the vertical, horizontal or diagonal, or all of the squares have been occupied so that it is impossible to achieve the aligned condition which indicates a winner.

For a full and more complete understanding of the invention, reference may be had to the following description and accompanying drawings, wherein:

FIG. 1 is a perspective of the embodiment of the subject device which is particularly adapted for use as a teaching aid and which illustrates the receptacle and removable panel in exploded relation;

FIG. 2 is a detailed section taken on an enlarged scale and about on the plane represented by the line 2—2 of FIG. 1;

FIG. 3 is another detailed section on an enlarged scale taken normal to the section of FIG. 2 and about on the plane depicted by the line 3—3 of FIG. 1;

FIG. 4 is still another detailed section on an enlarged scale through one side of the removable panel, being taken about on the plane represented by the line 4—4 of FIG. 1;

FIG. 5 is another detailed section on an enlarged scale taken about on the plane of line 5—5 of FIG. 2;

FIG. 6 is a fragmentary perspective of one corner of the removable panel looking at the top side thereof;

FIG. 7 is another fragmentary perspective looking at the opposite side of the corner depicted in FIG. 6;

FIG. 8 is a wiring diagram of the circuit from the battery to the lamps and switches controlled thereby;

FIG. 9 is a perspective of the embodiment designed for use in the playing of tic-tac-toe;

FIG. 10 is a detailed perspective looking at the bottom of two of the triangular pushbuttons for one of the squares of FIG. 9;

FIG. 11 is a detailed sectional view depicting one of the pushbuttons in which the lamp is mounted in a downwardly opening recess and the microswitch for that lamp;

FIG. 12 is a perspective of a modification in which the pushbuttons for either a game board or teaching aid are arranged in a circle;

FIG. 13 is a detailed perspective of one of the pushbuttons illustrated in FIG. 12;

FIG. 14 is a perspective of a corner portion of a game board intended to accommodate four players; and FIG. 15 is a detailed perspective of one of the pushbuttons of the game board of FIG. 14.

DESCRIPTION OF A PREFERRED EMBODIMENT

Referring now more particularly to FIGS. 1 to 8, inclusive, an embodiment of the subject device which is particularly adapted for use as a teaching aid will be described. A rectangularly shaped receptacle is designated generally 10 and comprises peripheral walls including a pair of end walls 11, a pair of side walls 12, a bottom wall 13 (FIGS. 2 and 3) and a fixed top panel 14. Receptacle 10 is divided into a plurality of rectangularly shaped compartments each of which is designated 15 and which is defined by vertical partitions 16 extending between end walls 11 and vertical partitions 17 extending between side walls 12. The wall structure so far described is opaque and is preferably formed of a desired plastic which is susceptible of being molded and fabricated into the structure illustrated.

Fixed top panel 14 covers each compartment 15 and is formed with a central orifice 18 which preferably is circular. Positioned in each orifice 18 is a pushbutton 19 which operates a switch represented diagrammatically at 19' in FIG. 8. Associated with each switch 19' is an electric lamp 21. A power source, such as one or more batteries 22, is secured in position immediately over bottom wall 13 and is adapted to be connected in circuit with any of the lamps 21 by the corresponding switch 19'. Each of the latter are received in sockets 20 connected to contact blades 20'.

As illustrated in FIGS. 1 and 3, one of the end walls 11 is formed with an alongate opening 23 which affords access to the batteries 22 for removal and replacement purposes. If convenient, power from a conventional house outlet may be used in conjunction with a transformer in accordance with well-known practice.

Side walls 12 are continued above fixed top panel 14 as illustrated in FIG. 1, and the projecting portions are formed with confronting grooves 24. A removable sliding panel is designated generally 25. It comprises a frame defined by side members 26 and end members 27. This frame 26, 27 is of a fairly solid plastic as illustrated in FIG. 4, and each of the side pieces 26 and 27 includes sections 28 which have sandwiched therebetween a sheet 29 of a plastic having the property of flexibility to a required degree. This flexible sheet may display different colors, figures, symbols or images, depending on the particular subject being taught to a pupil. Thus, as illustrated in FIG. 1, the outer surface of flexible panel 29 is covered with a plurality of disc-like layers 30 which display designations of particular colors and which are placed over the orifices 18 of fixed panel 14. Another series of discs 31 are positioned against the underface of flexible panel 29 and have the particular color on the disc 30 thereabove exhibited. Another example of displaying matter to be taught is illustrated in FIGS. 6 and 7. The word "cat" is spelled out on an upper disc 30 as shown in FIG. 6 and a pictorial illustration of a cat appears on a lower disc 31, as shown in FIG. 7.

The Tic-Tac-Toe Game Board

Referring now more particularly to FIGS. 10 and 11, a tic-tac-toe board is identified in its entirety by the reference character 32. It has the same wall structure described above in connection with the receptacle 10, with the notable exception that there are nine compartments corresponding to the compartments 15 of FIG. 2, with each such compartment receiving a pair of complemental triangularly shaped pushbuttons 33 and 34. A pushbutton 33 in each compartment will display indicia identifying a particular player such as a cross 35, which is a conventional symbol used in the playing of tic-tac-toe, and the pushbutton 34 exhibits a representation of a circle as shown at 36, which is also in accordance with conventional practice, although it is to be clearly understood that other indicia, such as colors, figures and numbers, may be employed to identify two opposing contestants.

As shown more clearly in FIG. 10, each of the triangular pushbuttons 33 and 34 is of a translucent plastic and is formed with a downwardly opening recess 37. Referring for the moment more particularly to FIG. 11, one of the pushbuttons 33, 34 is therein illustrated and, for the purposes of this specification, is designated 33. Recess 35 in pushbutton 33 receives an electric lamp 38 one side of which is operatively connected to a power source by the contact 39, while the other side is connected to a microswitch 40 which is closed or opened by downward movement of the pushbutton 33.

It is evident that with two people using the game board 32 to play tic-tac-toe, one player first selects one of the compartments which corresponds to the compartment 15 of FIG. 1 and presses downwardly on either of the pushbuttons 33 or 34 to complete the circuit to the lamp 38 in that recess. This indicates that the player has occupied that particular compartment. This operation is repeated by the other contestant until one player has three of his symbols in a row illuminated or as many of the compartments being indicated as being occupied, which renders it impossible to achieve the alignment which is necessary to win a game of tic-tac-toe.

The Game Board for Other Games

Referring now more particularly to FIGS. 14 and 15, a corner portion of a game board designated generally 41 is therein depicted. This game board is intended to be used in a game of the type in which a player moves a particular playing piece which identifies that player over a series of steps or spaces as determined by skill or a chance device and then uses some device to indicate that he has reached such a square.

Thus, game board 41 includes a rectangularly shaped receptacle corresponding to the receptacles 10 and 32 and which have the same wall structure, including a fixed top panel 42. The latter is formed with a plurality of square openings 43, with there being one of such openings for each step or space to be covered by a player in a particular move. Mounted in each of these square openings 43 are four square-shaped pushbuttons 44 each displaying indicia which identifies a particular player. Thus, this indicia may be four different colors, four letters, four numerals, or other symbols. Each pushbutton 44 is of a translucent plastic having a downwardly opening recess 45 which receives a lamp 38. A contact 39 and microswitch 40 are operatively associated with each lamp 38 as depicted in FIG. 11.

After a player makes a move, he counts the number of steps or spaces he is entitled to cover on the move as determined by skill or a chance device and counts that number out from a particular square to which he has indicated as having been previously entitled. He then presses a pushbutton 44 in the square which he has reached and turns off the light in the corresponding square which he has just left by exerting pressure on the pushbutton 44 for that square.

A slightly different embodiment is illustrated in FIGS. 12 and 13 in which a game board designated generally 46 has a fixed top panel 47 formed with a plurality of circular orifices 48 which are arranged in a circle, as illustrated in FIG. 12. Received in each orifice 48 is a pushbutton 49 having a downwardly opening recess 50 which receives an electric lamp and associated electrical instrumentalities described above in connection with the embodiments of FIGS. 10 and 14.

While preferred specific embodiments of the invention are hereinbefore set forth, it is to be clearly understood that the invention is not to be limited to the exact constructions, materials, devices and symbols illustrated and described because various modifications of these details may be provided in putting the invention into practice.

What is claimed is:
1. An educational device comprising in combination:
 a. a plurality of separate compartments each having an opening defined by walls of that compartment, said openings being substantially co-planar;
 b. a plurality of light sources disposed, respectively, in said compartment;
 c. power source means for supplying electrical power to said plurality of said light sources;
 d. a plurality of switches for controllably connecting said power source means to said respective ones of said light sources; and
 e. a flexible information bearing panel through which light can pass disposed over said plurality of compartments, said flexible information bearing panel including pieces of information corresponding to separate ones of said compartments, each of said plurality of switches being disposed in respective ones of said compartments, said flexible information bearing panel having a plurality of force receiving points located so that when a deforming force is applied to a first one of said force receiving points, said flexible information bearing panel deforms to actuate a first one of said switches, turning on a first one of said light sources, causing certain information of said flexible information bearing panel to become clearly visible to a user of said teaching device, said certain information being relatively invisible to the user of said educational device before said turning on of said first switch, said flexible information bearing panel being translucent, said flexible information bearing panel including a first information bearing section aligned over a first one of said compartments, said first information bearing section containing first information which is clearly externally visible to a user of said educational device whether or not the one of said lighting sources in said first compartment is turned off, said first information bearing section being disposed on an outer surface of said flexible information panel, said flexible information bearing panel including a second information bearing section aligned over said first compartment, said second information bearing section containing second information which becomes clearly visible to a user of said educational device only when said one of said lighting sources in said first compartment is turned on.

2. The educational device of claim 1 wherein each of said switches includes a switch element which is engaged by a respective portion of said flexible information bearing panel when a respective predetermined one of said force receiving points is pressed by the user of said educational device.

3. The educational device of claim 2 wherein each of said switches is connected to turn on and off the one of said light sources located in the same compartment as that switch.

4. The educational device of claim 3 wherein said flexible information bearing panel is conveniently removable.

5. The educational device of claim 4 further including a rigid panel overlying the openings of said compartments, said panel having a plurality of apertures aligned over said respective openings, said flexible information bearing panel being disposed adjacent said rigid panel, said force receiving points being aligned with said apertures and said switch elements.

6. The educational device of claim 1 wherein said first information bearing section is disposed on an outer surface of said flexible information panel.

7. The educational device of claim 1 wherein said second information bearing section is disposed on an inner surface of said flexible information bearing panel.

* * * * *